(12) United States Patent
Xu (10) Patent No.: US 12,131,191 B2
(45) Date of Patent: Oct. 29, 2024

(54) METHOD, DEVICE, COMPUTER DEVICE AND STORAGE DEVICE FOR REQUEST PROCESSING

(71) Applicant: Beijing Bytedance Network Technology Co., Ltd., Beijing (CN)

(72) Inventor: Junyu Xu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/639,016

(22) Filed: Apr. 18, 2024

(65) Prior Publication Data

US 2024/0264872 A1    Aug. 8, 2024

Related U.S. Application Data

(63) Continuation of application No. PCT/CN2023/076651, filed on Feb. 17, 2023.

(30) Foreign Application Priority Data

Mar. 8, 2022   (CN) .......................... 202210228680.7

(51) Int. Cl.
  *G06F 9/50*    (2006.01)
(52) U.S. Cl.
  CPC .................. *G06F 9/5027* (2013.01)
(58) Field of Classification Search
  None
  See application file for complete search history.

(56) References Cited

U.S. PATENT DOCUMENTS 8,260,940 B1 * 9/2012 Vosshall ................ H04L 12/287
                                                         709/228
10,097,431 B1 * 10/2018 Moniz ................. H04L 41/5045
(Continued)

FOREIGN PATENT DOCUMENTS

CN       107111519 A      8/2017
CN       107145393 A      9/2017
(Continued)

OTHER PUBLICATIONS

ISA China National Intellectual Property Administration, International Search Report Issued in Application No. PCT/CN2023/076651, May 24, 2023, WIPO, 5 pages.
(Continued)

*Primary Examiner* — Hiren P Patel
(74) *Attorney, Agent, or Firm* — Alleman Hall & Tuttle LLP (57) ABSTRACT

The present disclosure provides a method, an apparatus, a computer device and a storage medium of request processing, where the method comprises: obtaining an application usage request; forwarding, by using a traffic scheduler, the application usage request to a scalable service cluster; the scalable service cluster being used to run a created instance matching various application usage requests; and in response to receiving a non-idle state indication fed back by the scalable service cluster, forwarding, by using the traffic scheduler, the application usage request to a reserved service cluster, to run, by the reserved service cluster, a reserved instance matching the application usage request; where the non-idle state indication is used to indicate that the scalable service cluster currently has no idle and usable created instance.

17 Claims, 2 Drawing Sheets

(56) References Cited

U.S. PATENT DOCUMENTS

| | | | |
|---|---|---|---|
| 11,310,348 B2* | 4/2022 | Stephure | H04L 67/142 |
| 2003/0233602 A1* | 12/2003 | Lindquist | G06F 9/5055 |
| | | | 714/47.1 |
| 2004/0167980 A1* | 8/2004 | Doyle | G06F 9/5072 |
| | | | 709/225 |
| 2008/0060082 A1* | 3/2008 | Matthews | H04L 67/02 |
| | | | 726/27 |
| 2011/0078231 A1* | 3/2011 | Oliver | G06F 9/5055 |
| | | | 709/203 |
| 2011/0295970 A1* | 12/2011 | Miyazawa | G06F 9/5055 |
| | | | 709/217 |
| 2013/0262681 A1* | 10/2013 | Guo | G06F 9/5027 |
| | | | 709/226 |
| 2014/0181307 A1* | 6/2014 | Lee | H04L 45/42 |
| | | | 709/226 |
| 2015/0149637 A1* | 5/2015 | Chin | G06F 9/00 |
| | | | 709/226 |
| 2018/0063258 A1* | 3/2018 | Wang | H04L 65/613 |
| 2018/0295044 A1* | 10/2018 | Johnson | H04L 67/1017 |
| 2022/0200845 A1* | 6/2022 | Georgiev | H04L 67/55 |
| 2022/0329651 A1* | 10/2022 | Kim | H04L 67/1008 |
| 2024/0048460 A1* | 2/2024 | Wang | G06F 9/5077 |

FOREIGN PATENT DOCUMENTS

| | | |
|---|---|---|
| CN | 107665143 A | 2/2018 |
| CN | 110221920 A | 9/2019 |
| CN | 110474940 A | 11/2019 |
| CN | 111475235 A | 7/2020 |
| CN | 112650575 A | 4/2021 |
| CN | 113157418 A | 7/2021 |
| CN | 114615340 A | 6/2022 |
| WO | 2020135799 A1 | 7/2020 |

OTHER PUBLICATIONS

China National Intellectual Property Administration, Office Action and Search Report Issued in Application No. 202210228680.7 Aug. 1, 2023, 13 pages.

* cited by examiner

METHOD, DEVICE, COMPUTER DEVICE AND STORAGE DEVICE FOR REQUEST PROCESSING

CROSS REFERENCE OF RELATED APPLICATION(S)

The present application is a continuation of International Patent Application No. PCT/CN2023/076651, filed on Feb. 17, 2023, which claims priority to Chinese Patent Application No. 202210228680.7 filed on Mar. 8, 2022 and entitled "METHOD, DEVICE, COMPUTER DEVICE AND STORAGE DEVICE FOR REQUEST PROCESSING", both of which are incorporated herein by reference in their entireties.

FIELD

The present disclosure relates to the field of computer technology, and specifically, to a method, a device, a computer device and a storage medium for request processing.

BACKGROUND

Application instances based on Function-as-a-Service (FaaS for short) are usually deployed in application services in an established service cluster and may be used to respond to application usage requests initiated by users. However, when there is currently no usable application instance in the service cluster, it is usually necessary to perform a cold start of the application, that is, to re-create a new application service and re-deploy a new application instance on the created application service, and then to use the successfully deployed new application instances for responding to the application usage requests.

The above cold start process takes a long time, which in turn affects the time to respond to the application usage requests and reduces the speed and efficiency of responses to requests.

SUMMARY

The embodiments of the present disclosure provide at least a method, a device, a computer device and a storage medium for request processing.

In the first aspect, embodiments of the present disclosure provide a method of request processing, comprising:
  obtaining an application usage request;
  forwarding, by using a traffic scheduler, the application usage request to a scalable service cluster; the scalable service cluster being used to run a created instance matching various application usage requests; and
  in response to receiving a non-idle state indication fed back by the scalable service cluster is received, forwarding, by using the traffic scheduler, the application usage request to a reserved service cluster, to run, by the reversed service cluster, a reserved instance matching the application usage request;
  where the non-idle state indication is used to indicate that the scalable service cluster currently has no idle and usable created instance.

In a possible implementation, after receiving the non-idle status indication fed back by the scalable service cluster, the method further comprises:
  creating a new target application service corresponding to the application usage request by using a service expansion function corresponding to the scalable service cluster;
  deploying, in the target application service, at least one target application instance corresponding to a target application; and
  adding, into the scalable service cluster, the target application service having the successfully deployed target application instance, where the target application instance is used to respond to a new application usage request for the target application.

In a possible implementation, deploying the at least one target application instance corresponding to the target application in the target application service comprises:
  obtaining application codes corresponding to the target application, and loading the application codes into a storage location corresponding to the target application service;
  in response to the application code being successfully loaded, performing a port information obtaining operation on an application port corresponding to the application codes; and
  in response to the port information obtaining operation being completed, determining that the target application instance is deployed successfully; the application port being used for information transmission between the target application service and the target application instance.

In a possible implementation, forwarding, by using the traffic scheduler, the application usage request to the scalable service cluster comprises:
  determining, by using the traffic scheduler, identification information carried in the application usage request;
  selecting, by using the identification information, from a plurality of different scalable service clusters, the scalable service cluster to be used and corresponding to the target application indicated by the identification information; and
  forwarding the application usage request to the scalable service cluster to be used.

In a possible implementation, the method further comprises creating the reserved service cluster, including:
  determining a first number of reserved instances to be deployed, based on a request reception peak value of a target application corresponding to the application usage request at each time period and a processing resource amount of the reserved instance corresponding to the target application;
  determining a second number of reserved services to be created, based on a maximum number of deployed instances corresponding to the reserved service and the first number; and
  creating the second number of reserved services, and deploying a third number of reserved instances in each of the reserved services completely created, and treating the second number of reserved services having successfully deployed reserved instances, as the reserved service cluster, where a sum of the respective third numbers of reserved instances corresponding to the individual reserved services is equal to the first number.

In a possible implementation, creating the second number of reserved services and deploying the third number of reserved instances in each of the reserved services completely created comprises:
  selecting, from a plurality of service containers, a usable target service container for each of the reserved services in the second number of reserved services; and
  for each of the reserved service, creating the reserved service in a target service container corresponding to the reserved service, and deploying, in the target service container, the third number of reserved instances for the reserved service.

In a possible implementation, after running, by the reservation service cluster, the reserved instance matching the application usage request the method comprises:

obtaining a reserved instance matching the application usage request and a response result determined for the application usage request, and feeding the response result back to a user terminal sending the application usage request.

In a second aspect, embodiments of the present disclosure also provide a device for request processing, comprising:

an obtaining module configured to obtain an application usage request;

a first forwarding module configured to forward, by using a traffic scheduler, the application usage request to a scalable service cluster; the scalable service cluster being used to run a created instance matching various application usage requests;

a second forwarding module is configured to in response to receiving a non-idle state indication fed back by the scalable service cluster, forward, by using the traffic scheduler, the application usage request to a reserved service cluster to run, by the revered service cluster, a reserved instance matching the application usage requests;

where the non-idle state indication is used to indicate that the scalable service cluster currently have no idle and usable created instance.

In a possible implementation, the device further comprises:

a first creation module configured to after receiving a non-idle status indication fed back by the scalable service cluster, create a new target application service corresponding to the application usage request by using a service expansion function corresponding to the scalable service cluster;

deploy, in the target application service, at least one target application instance corresponding to a target application; and add, into the scalable service cluster, the target application service having the successfully deployed target application instance, where the target application instance is used to respond to a new application usage request for the target application.

In a possible implementation, the first creation module is configured to obtain application codes corresponding to the target application, and load the application codes into the storage location corresponding to the target application service;

in response to the application codes being successfully loaded, perform a port information obtaining operation on an application port corresponding to the application codes; and in response to the port information obtaining operation being completed, determine that the target application instance is deployed successfully; the application port being used to information transmission between the target application service and the target application instance.

In a possible implementation, the first forwarding module is configured to determine, by using the traffic scheduler, identification information carried in the application usage request;

select, by using the identification information, from a plurality of different scalable service clusters, the scalable service cluster to be used and corresponding to the target application indicated by the identification information; and forward the application usage request to the scalable service cluster to be used.

In a possible implementation, the device further comprises:

a second creation module configured to create the reserved service cluster according to the following steps:

determining a first number of reserved instances to be deployed, based on a request reception peak value of a target application corresponding to the application usage request at each time period and a processing resource amount of the reserved instance corresponding to the target application;

determining a second number of reserved services to be created, based on a maximum number of deployed instances corresponding to the reserved service and the first number; and creating the second number of reserved services, and deploying a third number of reserved instances in each of the reserved services completely created, and treating the second number of reserved services having successfully deployed reserved instances, as the reserved service cluster, where a sum of the respective third numbers of reserved instances corresponding to the individual reserved services is equal to the first number.

In a possible implementation, the second creation module is configured to select, from a plurality of service containers, a usable target service container for each of the reserved services in the second number of reserved services;

for each of the reserved service, create the reserved service in a target service container corresponding to the reserved service, and deploy, in the target service container, the third number of reserved instances for the reserved service.

In a possible implementation, the device further comprises:

a feedback module configured to after running, by the reservation service cluster, the reservation instance matching the application usage request, obtain the reserved instance matching the application usage request and a response result determined for the application usage request, and feeding the response result back to a user terminal sending the application usage request.

In a third aspect, an optional implementation of the present disclosure further provides a computer device, a processor, and a memory, the memory storing machine-readable instructions executable by the processor, and the processor being configured to execute the machine-readable instructions stored in the memory, the machine-readable instructions, upon execution by the processor, causing the processor to perform the steps of the above-mentioned first aspect, or any possible implementation of the first aspect.

In a fourth aspect, an optional implementation of the present disclosure further provides a computer-readable storage medium storing a computer program thereon, the computer program, upon running by a computer device, causing the processor to perform the above-mentioned first aspect, or any possible implementation of the first aspects.

In a fifth aspect, an optional implementation of the present disclosure further provides a computer program product, the computer program product, upon running by a computer, causing the computer to perform the above-mentioned first aspect, or any steps in possible implementation of the first aspect.

A description of the effects of the above request processing device, computer device, and computer-readable storage medium, refer to the description of the above request processing method, and will not be repeated herein.

The method, device, computer equipment and storage medium of request processing provided by the embodiments of the present disclosure, in a case that it is determined that there is no idle and usable created instance in the scalable service cluster, send, by using the traffic scheduler, the application usage request to the pre-created reserved service cluster, and run, by the reserved service cluster, a reserved instance matching the application usage request. It is possible to achieve a fast response to the application usage request using the created reserved instance, improving the speed and efficiency of the responses to requests. Compared with the existing technology where in a case that it is determined that there is currently no idle and usable created instances in the scalable service cluster, it is necessary to wait for a new instance to be re-created and then use the created new instance to respond to the application usage request, which reduces the speed and efficiency of the responses to requests, the speed and efficiency of responses to requests may be effectively improved by pre-creating the reserved service clusters and flexibly forwarding, by using the traffic scheduler, the application usage requests in scalable service clusters and reserved service clusters.

Furthermore, the method, device, computer equipment and storage medium of request processing provided by the embodiments of the present disclosure may, after determining that there is currently no idle and usable created instance in the scalable service cluster, by creating a new target application service and deploying an application instance in the scalable service cluster, it is enabled to utilize the idle and usable application instances to respond quickly to new application usage requests forwarded by the traffic scheduler in subsequent times, improving the speed and efficiency of responding to new application usage requests.

In order to make the above objects, features and advantages of the present disclosure more obvious and understandable, the following is a detailed description of some embodiments with reference to the accompanying drawings, as follows.

BRIEF DESCRIPTION OF THE DRAWINGS

In order to more clearly illustrate the technical solution of the embodiments of the present disclosure, the following is a brief introduction to the accompanying drawings required to be used in the embodiments, which are herein incorporated into the specification and constitute a part of the present specification, and which show embodiments consistent with the present disclosure and are used in conjunction with the specification to illustrate technical solutions of embodiments of the present disclosure. It should be understood that the following accompanying drawings only show certain embodiments of the present disclosure, and therefore should not be regarded as limiting the scope, and other relevant drawings may be obtained from these drawings by a person of ordinary skill in the art without creative labor.

DETAILED DESCRIPTION

In order to make the purpose, technical solutions and advantages of the embodiments of the disclosure clearer, the technical solutions in the embodiments of the disclosure will be clearly and completely described below in conjunction with the accompanying drawings of the embodiments of the disclosure, and it is obvious that the described embodiments are only a part of the present disclosure embodiments, not all embodiments. The components of embodiments of the present disclosure generally described and shown herein may be arranged and designed in a variety of different configurations. Accordingly, the following detailed description of embodiments of the present disclosure is not intended to limit the scope of the present disclosure, but rather merely represent selected embodiments of the present disclosure. Based on the embodiments of the present disclosure, all other embodiments obtained by those skilled in the art without any creative labor are within the scope of protection of the present disclosure.

In addition, the terms "first", "second", and the like in the description of the embodiments of the present disclosure, claims and the accompanying drawings described above are used to distinguish similar objects, and are not necessarily used to describe a particular order or sequence. It should be understood that the data so used may be interchanged under appropriate cases, so that the embodiments described herein may be implemented in an order other than those illustrated or described herein.

The term "multiple or several" mentioned in this article is used to refer to two or more. "And/or" describes the association relationship between the associated objects and indicates that there may be three kinds of relationships. For example, A and/or B may represent: A exists alone, A and B exist simultaneously, and B exists alone. The character "/" generally indicates an "or" relationship between an associated object and an associated object.

It has been found that in the case of a large number of concurrent application usage requests, if there is no idle and usable FaaS application instance in the created scalable service cluster that may be used to process the above application usage requests, or if the idle and usable FaaS application instances in the scalable service cluster cannot enable the respond to all concurrent application usage requests, a cold start of the application is required. A certain number of new FaaS application instances are created in the scalable service cluster to allow automatic expansion of the scalable service cluster, thereby eventually achieving responses to all application usage requests. However, it takes a certain amount of time to create a new FaaS application instance, which increases the time to respond to application usage requests and reduces the speed and efficiency of responses to requests.

Based on the above research, the embodiments of the present disclosure provide a method, a device, a computer device and a storage medium of request processing where by creating a reserved service cluster in advance and flexibly forwarding, by using a traffic scheduler, the application usage request in the scalable service cluster and the reserved service cluster, a problem of waiting for creating a new application instance before responding to application usage requests, which increases the time for responding to application usage requests, may be avoided, effectively improving the speed and efficiency of responses to requests.

The defects of the above approaches are concluded by the inventors after practice and careful study. Therefore, the discovery process of the above problem and the solutions proposed by the embodiments of the present disclosure for the above problem below should be the contribution of the inventor to the present disclosure.

It should be noted that similar reference numerals and letters represent similar items in the following accompanying drawings, and therefore, once an item is defined in one accompanying drawing, there is no need for further definition and explanation in subsequent accompanying drawings.

In order to facilitate understanding of the present embodiment, a method of request processing disclosed in the present disclosure is first introduced in detail. The executer of the method of request processing provided in the present disclosure is generally a computer device having a certain computing capability. In some possible implementations, the method of request processing may be implemented by the processor calling computer-readable instructions stored in the memory.

The method of request processing provided by embodiments of the present disclosure is described below using an example in which the execution subject is a computer device.

Figure 1:
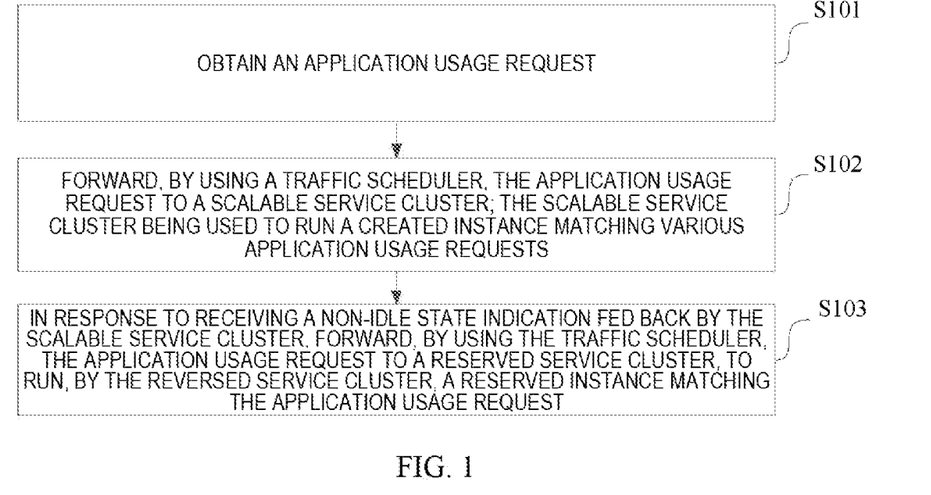
FIG. 1 shows a flowchart of a method of request processing according to embodiments of the present disclosure.

As shown in FIG. 1, which is a flowchart of a method of request processing according to an embodiment of the present disclosure, which may comprise the following steps:

S101: an application usage request is obtained.

Here, the application usage request may be a request initiated by the user side to use the target application. For example, it may be a request to load an application page corresponding to the target application, a request to access the target application, and the like.

In a specific implementation, the obtained application usage request may include one or more requests. In the case that the obtained application usage request includes a plurality of obtaining application usage requests, the plurality of application usage requests may be initiated in a concurrent manner at the same time.

S102: by using a traffic scheduler, the application usage requests is forwarded to a scalable service cluster; the scalable service cluster is used to run a created instance matching various application usage requests.

Here, the traffic scheduler is used to forward the obtained various application usage requests to the corresponding scalable service cluster. Specifically, the traffic scheduler may be a Gateway scheduler.

The scalable service cluster may include one or more created application services. Each application service may include one or more created instances. The scalable service cluster is used to run various created instances included, which may be used to respond to various application usage requests. Specifically, the number of created application services in the scalable service cluster and the number of created instances in each created application service may be determined according to the applications served by the scalable service cluster.

The scalable service cluster may include one or more scalable service clusters. Each scalable service cluster corresponds to different applications, and various created application service in the same scalable service cluster corresponds to the same application. That is, for any scalable service cluster, various created application services included in the scalable service cluster are services for the same application, and various created instances in various created application services included in the scalable service cluster are used to respond to various application usage requests for the same application. For example, the application served by scalable service cluster A is application A, then various created application services A in scalable service cluster A are a service for application A, and various created instances A in various created application services A are used to respond to various application usage requests for application A.

Specifically, the scalable service cluster may be a Serverless auto-scaling cluster where Serverless stands for Serverless computing, also known as FaaS. The Serverless auto-scaling cluster is a fully resilient service cluster that relies on functions provided by the serverless provider for auto-scaling.

In a specific implementation, after obtaining an application usage request, the traffic scheduler may first be utilized to determine the scalable service cluster corresponding to the application usage request, and send the application usage request to the scalable service cluster.

Here, if the obtained application usage request includes a plurality of application usage requests, for each application usage request, the traffic scheduler may be utilized to determine the scalable service cluster for the application usage request, and then send the application usage request to the scalable service cluster.

S103: in response to receiving a non-idle state indication fed back by the scalable service cluster, the application usage request is forwarded by the traffic scheduler to a reserved service cluster, to run, by the reversed service cluster, a reserved instance matching the application usage request.

Here, the non-idle state indication is used to indicate that the scalable service cluster currently has no idle and usable created instance, which is the information fed back by the scalable service cluster.

The reserved service cluster is a pre-created service cluster, which includes one or more idle reserved services created in advance, and each reserved service includes one or more idle reserved instances.

The reserved service cluster may serve as a back-up service cluster. Only after forwarding the application usage request to the scalable service cluster and receiving the non-idle status indication, the traffic scheduler forwards the application usage request to the reserved service cluster corresponding to the application usage request, to utilize the idle reserved instances in the reserved service cluster to respond to the application usage request.

In a specific implementation, after the scalable service cluster receives the application usage request sent by the traffic scheduler, if there are idle and usable created instances in the scalable service cluster, the idle and usable instance may be run by the scalable service cluster, and the idle and usable created instances may be utilized by the idle and usable created instances to respond to the application usage request, thereby determining a response result corresponding to the application usage request.

On the contrary, if it is determined that there are no idle and usable created instances, that is, if it is determined that it cannot directly respond to the application usage request, the scalable service cluster may generate a non-idle status indication and feed it back to the traffic scheduler. Here, the non-idle status indication may specifically be a status code.

Furthermore, after receiving the non-idle status indication, the traffic scheduler may determine a reserved service cluster that may be used to respond to the application usage request, and forward the application usage request to the determined reserved service cluster.

Further, after receiving the application usage request forwarded by the traffic scheduler, the reservation service cluster may run the reserved instance that matches the application usage request, and use the running reserved instance to respond to the application usage request, thereby determining a response result corresponding to the application usage request.

In this way, in the case that it is determined that there is currently no idle and usable created instances in the scalable service cluster, the traffic scheduler is utilized to send the application usage request to the pre-created reserved service cluster. By running the reserved instance in the reserved service cluster that matches the application use request, it is possible to enable a fast response to the application usage request by utilizing the created reserved instance, which improves the speed and efficiency of the response to the request. Compared with the existing technology where in the case that it is determined that there are currently no idle and usable created instances in the scalable service cluster, it is necessary to wait for a new instance to be re-created, and then utilize the created new instance to respond to the application usage request, which reduces the speed and efficiency of the response to the request, the speed and efficiency of the response to the request may be effectively improved by pre-creating the reserved service cluster, and by utilizing the traffic scheduler to flexibly forward the application usage requests in the scalable service clusters and the reserved service clusters.

In one embodiment, after running, by the reservation service cluster, the reserved instance that matches the application usage request, it is also possible to obtain the reserved instance that matches the application usage request and the response result determined for the application usage request, and feed the response result back to the user terminal that sent the application usage request.

Here, the response result is the result determined for the application usage request after the reserved instance responds to the request. For example, the response result may be the determined application page information corresponding to the application usage request, function information corresponding to the application usage request, and so on. The user terminal may be a terminal device, a browser, a personal mobile terminal, and the like, and the specific user terminal is not limited by the embodiments of the present disclosure.

Specifically, after responding to the application usage request by utilizing the reserved instance and determining the response result corresponding to the application usage request, the response result may be obtained, and the response result may be fed back to the user terminal that initiated the application usage request. For example, the obtained application page information may be fed back to the browser, and then the browser may render and display the application page based on the application page information.

Moreover, after the response to the application use request is completed using the reserved instance, the computing resources in the reserved instance may be released to obtain an idle and usable reserved instance.

In an embodiment, after receiving the non-idle status indication fed back by the scalable service cluster, in addition to utilizing the reserved instances in the reserved cluster to respond to application usage requests, the step of performing service expansion in the scalable service cluster may be performed asynchronously. Specifically, the service expansion may be performed in accordance with the following steps:

Step 1: a new target application service corresponding to the application usage request is created by using a service expansion function corresponding to the scalable service cluster.

Here, the above-mentioned service expansion function may be the automatic expansion capacity corresponding to the expandable service cluster, and the above-mentioned new target application service is the service for the target application corresponding to the application trial request. Specifically, the new target application service is the same service as the application service that has been created in the scalable service cluster.

In a specific implementation, the target application corresponding to the application usage request may be determined first, and then the service expansion function corresponding to the scalable service cluster may be directly utilized to create a new target application service in the scalable service cluster.

Step 2: at least one target application instance corresponding to a target application is deployed in the target application service.

Here, the target application instance has the same function as the created instance in the scalable service cluster, and is used to respond to various application usage requests for the target application. Specifically, at least one target application instance corresponding to the target application may be deployed in the target application service, and the specific number of deployed target application instances may be set according to the actual development needs and is not limited here. For example, the deployment may be performed according to the maximum number of target application instances that the target application service may support for deployment. Alternatively, the number of target application instances required to respond to all application usage requests may be determined based on the number of currently obtaining application usage requests, and the target application instances may be deployed according to this number.

In an embodiment, this step 2 may be implemented according to the following sub-steps:

Sub-step 1: the application code corresponding to the target application is obtained, and the application code is loaded into the storage location corresponding to the target application service.

Here, the application code is the code required for loading the target application. The storage location corresponding to the target application service is the memory corresponding to the scalable service cluster.

For example, the application code may be directly pulled at the location where the application code corresponding to the target application is stored, and the pulled application code is loaded into the memory corresponding to the target application service.

Sub-step 2: in response to the application code being successfully loaded, a port information obtaining operation is perform on an application port corresponding to the application codes.

Here, each target application instance may be correspondingly assigned an application port, and the application port is used for information transmission between the target application service and the target application instance, such as the transmission of application usage requests, and the transmission of response results corresponding to the application usage requests. The application port corresponding to the application code is the port of the target application instance.

Specifically, in the case that the application code is successfully loaded into the memory, the port information obtaining operation may be performed on the application port assigned to the target application instance, that is, the port listening operation may be performed.

Sub-step 3: in response to the port information obtaining operation being completed, it is determined that the target application instance is deployed successfully.

For example, in the case that the port listening operation is completed, it is determined that the target application instance is successfully deployed in the target application service.

In the case of deploying a plurality of target application instances, the deployment process of each target application instance may refer to the above sub-steps 1 to 3.

Step 3: the target application service having the successfully deployed target application instance is added into the scalable service cluster, where the target application instance is used to respond to a new application usage request for the target application.

For example, a target application service that has successfully deployed at least one target application instance may be used as a newly expanded service in the scalable service cluster. In this way, the newly created target application service in the scalable service cluster may be used as a new created application service in the scalable service cluster, and each successfully deployed target application instance may be used as a new created application service in the scalable service cluster. Thus, the successfully deployed target application instance described above may be utilized for responding to newly received subsequent application usage requests.

Alternatively, in an implementation, a plurality of new target application services corresponding to the application usage requests may also be created by utilizing the service expansion function corresponding to the scalable service cluster, and at least one target application instance may be deployed in each of the new target application services in accordance with the above steps.

In an embodiment, for S102, the following steps may be implemented:

S102-1: identification information carried in the application usage request may be determined by using the traffic scheduler.

Here, the identification information may be the application identification of the target application corresponding to the application use request. For example, it may be an application identification number (Identity Document, ID), application name, and so on.

In a specific implementation, the traffic scheduler may be utilized to parse the application usage request and determine the application identifier carried therein.

S102-2: the scalable service cluster to be used and corresponding to the target application indicated by the identification information is selected from a plurality of different scalable service clusters by using the identification information, and the application usage request is forwarded to the scalable service cluster to be used.

Here, the scalable service cluster may include a plurality of scalable service clusters, and different scalable service clusters may serve different applications. That is, different applications may correspond to different scalable service clusters, and each application may correspond to unused identification information. Thus, different identification information may be directed to point to the scalable service cluster corresponding to the service identification information.

In a specific implementation, after determining the identification information corresponding to the application usage request, the scalable service cluster to be used and pointed to by the identification information may be filtered out from the plurality of different scalable service clusters, and the application usage request may be forwarded to the scalable service cluster to be used.

In an embodiment, the method of request processing according to the embodiment of the present disclosure also includes the step of creating a reserved service cluster:

S1: a first number of reserved instances to be deployed is determined based on a request reception peak value of a target application corresponding to the application usage request at each time period and a processing resource amount of the reserved instance corresponding to the target application.

Here, the request reception peak value is the maximum number of application usage requests received by the target application at each time period. The amount of processing resources of a reserved instance is used to represent the maximum number of application usage requests that the reserved instance may respond to at the same time. For example, the maximum number of application usage requests that the reserved instance may respond to at the same time may be determined based on the amount of resources required to process each application usage request and the amount of processing resources of the reserved instance. The number of time periods may be set according to actual development needs. For example, the time intervals corresponding to each time period are 10 minutes, 1 hour, and so on, and when the time interval is 1 hour, 24 time periods may be set in one day. The first number is the number of reserved instances that need to be deployed.

In a specific implementation, after determining the request reception peak value of the target application at each time period, a maximum request reception peak value may be determined from a plurality of request reception peak values. Then, a second maximum number of application usage requests that need to be simultaneously processed by the reserved instances is determined based on the first maximum number of application usage requests that may be simultaneously processed by the created instances in the scalable service cluster corresponding to the target application, and by subtracting the first maximum number by the maximum request reception peak. The first number of reserved instances to be deployed is determined based on the amount of processing resources for each of the reserved instances and the amount of resources required to process the second maximum number of application usage requests.

S2: a second number of reserved services to be created is determined based on a maximum number of deployed instances corresponding to the reserved service and the first number.

Here, the maximum number of instances deployed is the maximum number of reserved instances that may be deployed for each reserved service.

S3: the second number of reserved services are created, and a third number of reserved instances are deployed in each of the reserved services completely created, and the second number of reserved services having successfully deployed reserved instances are treated as the reserved service cluster, where a sum of the respective third numbers of reserved instances corresponding to the individual reserved services is equal to the first number.

Here, a second number of reserved services may be created first, and a third number of reserved instances may be deployed in each of the completed created reserved service. Here, the third number of reserved instances deployed in each reserved service is less than or equal to the maximum number of instances deployed, and the sum of the third number of reserved instances corresponding to each reserved service is equal to the first number. Furthermore, in an implementation, each of the second number of reserved services created may be a non-scalable service.

Further, a second number of reserved services with successfully deployed reserved services may be used as a reserved service cluster. Here, in the case that each reserved service is a non-scalable service, the reserved service cluster is also a service cluster that cannot be automatically scalable.

In an embodiment, for the step of creating a second number of reserved services and deploying a third number of reserved instances in each of the completed created reserved services, a usable target service container may also be selected from the plurality of service containers for each of the second number of reserved services. Here, the service container may be a docker container, and the reserved service created in the docker container may be a service that may be scalable. A predetermined number of reserved services may be created in each service container. The target service container is the service container filtered for creating reserved services, and each target service container is in an idle and usable status. Here, the docker container is an open source application container engine that allows developers to package their applications in a uniform way and put packages into a portable container, and then publish them to any server with the docker engine installed.

Specifically, the target number of target service containers to be used may be determined based on the predetermined number and the second number. Then, a target number of target service containers that may be used is selected from the plurality of service containers.

Further, for each reserved service, the reserved service is created in a target service container corresponding to the reserved service, and a third number of reserved instances are deployed for the reserved service, in the target service container.

Here, for each reserved service, any selected target service container may be the target service container corresponding to the reserved service. In a specific implementation, a reserved service may be created in each target service container, and a third number of reserved instances may be deployed for the successfully created reserved service, and finally, a second number of reserved services may be successfully created in the target number of target service containers, and a third number of reserved instances are deployed for each reserved service.

For example, Kubernetes may be used to create a second number of reserved services and deploy a third number of reserved instances in each reserved service. Here, kubernetes, K8s for short, is an open source for managing containerized applications on a plurality of hosts in the cloud platform, and the goal of Kubernetes is to make the deployment of containerized applications simple and efficient.

Figure 2:
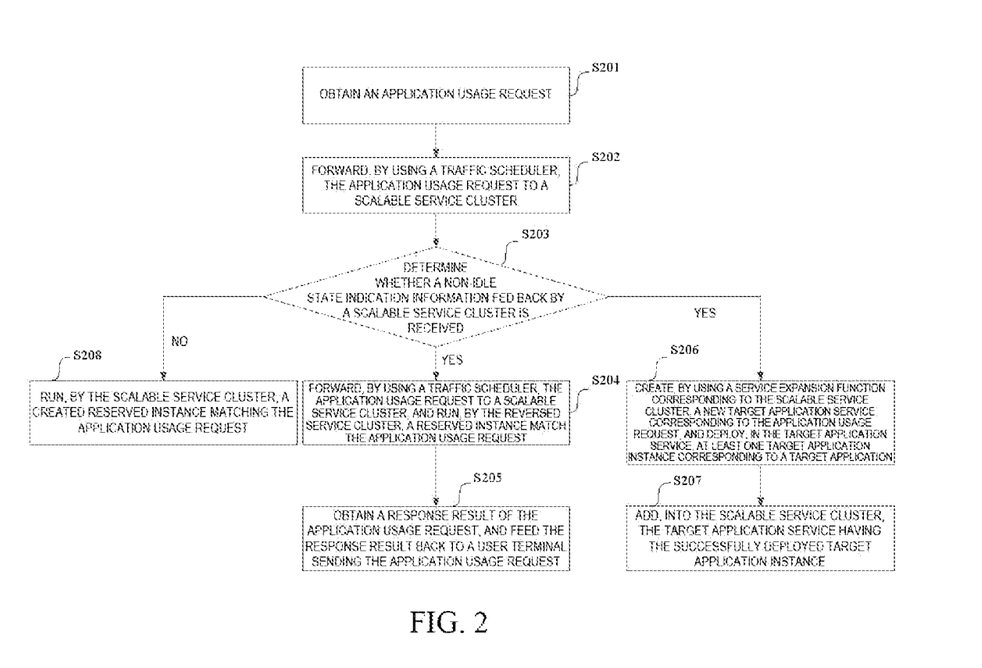
FIG. 2 shows a specific implementation flowchart of a method of request processing according to embodiments of the present disclosure.

As shown in FIG. 2, the specific implementation flowchart of a method of request processing according to embodiments of the present disclosure may comprise the following steps:

S201: an application usage request is obtained.

S202: the application usage request is forwarded to a scalable service cluster by using a traffic scheduler.

S203: it is determining whether the non-idle status indication fed back by the scalable service cluster is received.

If yes, S204 is executed and S206; if not, S208 is executed.

S204: the application usage request is forwarded to a reserved service cluster by the traffic scheduler, to run, by the reversed service cluster, a reserved instance matching the application usage request.

Here, the running reserved instance may be utilized to respond to the application usage request, thereby determining the response result of the application usage request.

S205: the response result of the application usage request is obtained, and the response result is fed back to the user terminal that sent the application usage request.

S206: a new target application service corresponding to the application usage request is created by using the service expansion function corresponding to the scalable service cluster, and at least one target application instance corresponding to a target application is deployed in the target application service.

S207: the target application service having the successfully deployed the target application instance is added into the scalable service cluster.

Here, the target application instance is used to respond to the new application usage request for the target application to determine the response result corresponding to the new application usage request for the target application. Further, after determining the response result of the new application use request utilizing the target application instance, the above S205 may be executed.

S208: the created instance matching the application usage request is run by the scalable service cluster.

Here, a response result to the application usage request may be determined by responding to the application usage request utilizing the running created instance. Afterwards, the above S205 may be executed to feed the determined response result back to the user terminal.

Regarding the specific implementation process of the above S201~S208, reference may be made to the above embodiments, which will not be repeated herein.

Those skilled in the art can understand that in the above method of the detailed description, the writing order of each step does not mean a strict execution order and does not constitute any limitation on the implementation process, and the specific execution order of each step should be determined by their functions and possible internal logic.

Based on the same inventive concept, the embodiments of the present disclosure also provide a device for request processing corresponding to the method of request processing, and since the principle of solving problems by the device in the embodiments of the disclosure is similar to the above method of request processing of the embodiments of the disclosure, the implementation of the device may be referred to the method, and the implementation will not be repeated again.

Figure 3:
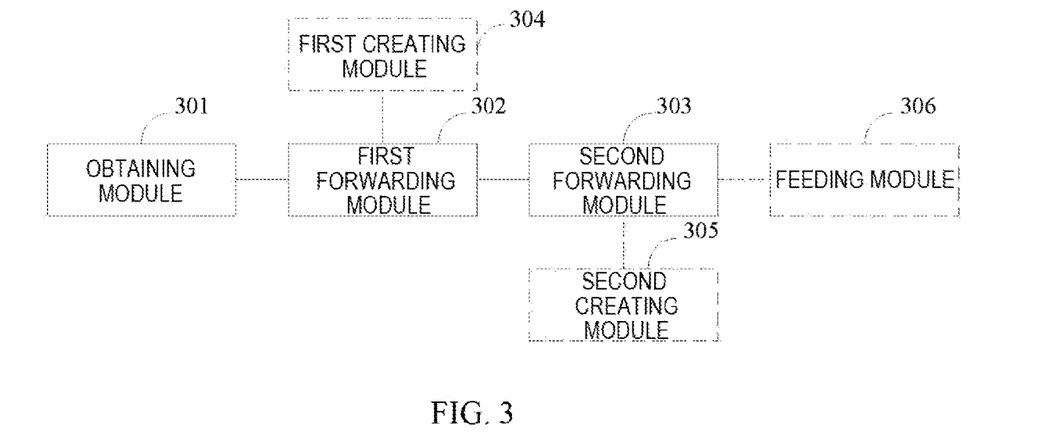
FIG. 3 shows a schematic diagram of a device for request processing according to embodiments of the present disclosure.

As shown in FIG. 3, a schematic diagram of a device for request processing according to embodiments of the present disclosure comprises:

an obtaining module 301 configured to obtain an application usage request;

a first forwarding module 302 configured to forward, by using a traffic scheduler, the application usage request to a scalable service cluster; the scalable service cluster being used to run a created instance matching various application usage requests;

a second forwarding module 303 configured to in response to receiving a non-idle state indication fed back by the scalable service cluster, forward, by using the traffic scheduler, the application usage request to a reserved service cluster to run, by the revered service cluster, a reserved instance matching the application usage requests;

where the non-idle status indication is used to indicate that the scalable service cluster currently does not has an idle and usable created instance.

In a possible implementation, the device further comprises:

a first creation module 304 configured to after receiving the non-idle state indication fed back by the scalable service cluster, create a new target application service corresponding to the application usage request by using a service expansion function corresponding to the scalable service cluster;

deploy, in the target application service, at least one target application instance corresponding to a target application; and add, into the scalable service cluster, the target application service having the successfully deployed target application instance, where the target application instance is used to respond to a new application usage request for the target application.

In a possible implementation, the first creation module 304 is configured to obtain the application codes corresponding to the target application, and load the application codes into the storage location corresponding to the target application service;

in response to the application code being successfully loaded, perform a port information obtaining operation on an application port corresponding to the application codes; and in response to the port information obtaining operation being completed, determine that the target application instance is deployed successfully; the application port being used for information transmission between the target application service and the target application instance.

In a possible implementation, the first forwarding module 302 is configured to determine, by using the traffic scheduler, identification information carried in the application usage request;

select, by using the identification information, from a plurality of different scalable service clusters, the scalable service cluster to be used and corresponding to the target application indicated by the identification information; and forward the application usage request to the scalable service cluster to be used.

In a possible implementation, the device further comprises:

the second creation module 305 configured to create the reserved service clusters according to the following steps:

determining a first number of reserved instances to be deployed, based on a request reception peak value of a target application corresponding to the application usage request at each time period and a processing resource amount of the reserved instance corresponding to the target application;

determining a second number of reserved services to be created, based on a maximum number of deployed instances corresponding to the reserved service and the first number; and creating the second number of reserved services, and deploying a third number of reserved instances in each of the reserved services completely created, and treating the second number of reserved services having successfully deployed reserved instances as the reserved service cluster, where a sum of the respective third numbers of reserved instances corresponding to the individual reserved services is equal to the first number.

In a possible implementation, the second creation module 305 is configured to select, from a plurality of service containers, a usable target service container for each of the reserved services in the second number of reserved services; and for each of the reserved service, create the reserved service in a target service container corresponding to the reserved service, and deploy, in the target service container, the third number of reserved instances for the reserved service.

In a possible implementation, the device further comprises:

a feedbacking module 306 configured to after running the reserved instance matching the application usage request through the reserved service cluster, obtain a reserved instance matching the application usage request and a response result determined for the application usage request, and feed the response result back to a user terminal sending the application usage request.

The description of the processing flow of various modules in the device and the interaction flow between various modules may be referred to the relevant descriptions in the above method embodiments, and will not be described in detail here.

Figure 4:
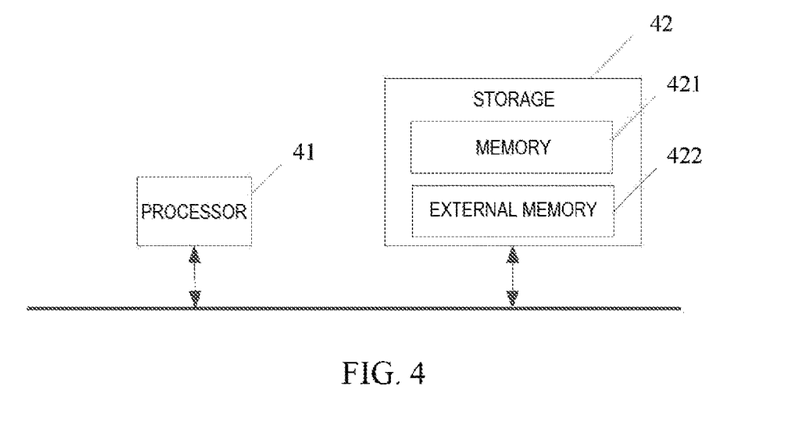
FIG. 4 shows a schematic structural diagram of a computer device according to embodiments of the present disclosure.

The embodiments of the present disclosure also provide a computer device, as shown in FIG. 4, a schematic structural diagram of a computer device according to the embodiments of the present disclosure, comprising:

a processor 41 and a memory 42; the memory 42 storing machine-readable instructions executable by the processor 41, and the processor 41 configured to execute the machine-readable instructions stored in the memory 42, in response to the machine-readable instructions being executed by the processor 41, the processor 41 executing the following steps: S101: obtaining an application usage request; S102: forwarding, by using a traffic scheduler, the application usage request to a scalable service cluster; the scalable service cluster being used to run a created instance matching various application usage requests; and S103: in response to receiving a non-idle state indication fed back by the scalable service cluster is received, forwarding, by using the traffic scheduler, the application usage request to a reserved service cluster, to run, by the reversed service cluster, a reserved instance matching the application usage request.

The above memory 42 comprises a memory 421 and an external memory 422; the memory 421 here is also called an internal memory, configured to temporarily store the operation data in the processor 41, as well as the data exchanged with external memory 422 such as a hard disk, the processor 41 exchanges data with the external memory 422 through the memory 421.

The specific execution process of the above instructions may refer to the steps of the method of request processing described in embodiments of this disclosure, and will not be repeated again here.

The embodiments of the present disclosure also provide a computer-readable storage medium. The computer-readable storage medium stores a computer program. When the computer program is run by a processor, the steps of the method of request processing described in the above method embodiments are executed. Here, the storage medium may be a volatile or non-volatile computer-readable storage medium.

The computer program product of the method of request processing according to the embodiments of the present disclosure, includes a computer-readable storage medium storing program code. The instructions included in the program code may be used to execute the steps of the request processing method described in the above method embodiments. Specifically, it may be referred to the above method embodiments, and will not be repeated again here.

The computer program product may be implemented specifically by means of hardware, software or a combination thereof. In an optional embodiment, the computer program product is specifically embodied as a computer storage medium. In another optional embodiment, the computer program product is specifically embodied as a software product, such as a Software Development Kit (SDK) and so on.

Those skilled in the art may clearly understand that for the convenience and simplicity of description, the specific working process of the above-described device may be referred to the corresponding process in the aforementioned method embodiments, and will not be repeated again here. In the several embodiments provided in the present disclosure, it should be understood that the disclosed devices and methods may be implemented in other ways. The device embodiments described above are only illustrative, for example, the division of the units is only a logical function division. There may be other division approaches in implementations. For example, a plurality of units or components may be combined, or some features may be ignored, or not implemented. On the other hand, the coupling or direct coupling or communication connection between each other shown or discussed may be through some communication interfaces, and the indirect coupling or communication connection of the devices or units may be in electrical, mechanical or other forms.

The units illustrated as separate components may or may not be physically separated, and the components shown as units may or may not be physical units. That is, they may be located in one place, or they may be distributed to a plurality of network units. Some or all of the units may be selected according to actual needs to achieve the purpose of embodiments.

In addition, various functional units in various embodiments of the present disclosure may be integrated into one processing unit, or various units may exist physically alone, or two or more units may be integrated into one unit.

If the functions are implemented in the form of software functional units and sold or used as independent products, they may be stored in a non-volatile computer-readable storage medium that is executable by a processor. Based on this understanding, the technical solution of the embodiments of the present disclosure is essentially or the part that contributes to the existing technology or the part of the technical solution may be embodied in the form of a software product, and the computer software product is stored in a storage medium, and includes several instructions to cause a computer device (which may be a personal computer, a server, or a network device, etc.) to execute all or part of the steps of the method described in various embodiments of the present disclosure. The aforementioned storage media include: U disk, mobile hard disk, Read-Only Memory (ROM), Random Access Memory (RAM), magnetic disk or optical disk and other media that may store program codes.

Finally, it should be noted that the above embodiments are only implementations of the present disclosure and are used to illustrate the technical solutions of the present disclosure, rather than to limit them. The protection scope of the present disclosure is not limited thereto. Although the present disclosure has been described in detail with reference to the foregoing embodiments, those of ordinary skill in the art should understand: any skilled person familiar with the technical field may still make modifications to the technical solutions recorded in the foregoing embodiments or may easily think of changes within the technical scope disclosed in this disclosure, or make equivalent substitutions for some of the technical features; these modifications, changes or substitutions do not deviate the essence of the corresponding technical solution from the spirit and scope of the embodiment technical solution of the present disclosure, and shall be covered by the protection scope of the present disclosure. Therefore, the protection scope of the present disclosure shall be subject to the protection scope of claims.

I claim:

1. A method of request processing, comprising:
   obtaining an application usage request;
   determining, by using a traffic scheduler, identification information carried in the application usage request;
   selecting, by using the identification information, from a plurality of different scalable service clusters, a scalable service cluster; the scalable service cluster to be used to run a created instance matching various application usage requests, and corresponding to a target application indicated by the identification information;
   forwarding, by using the traffic scheduler, the application usage request to the scalable service cluster to be used; and
   in response to receiving a non-idle state indication fed back by the scalable service cluster, forwarding, by using the traffic scheduler, the application usage request to a reserved service cluster, to run, by the reserved service cluster, a reserved instance matching the application usage request;
   wherein the non-idle state indication is used to indicate that the scalable service cluster currently has no idle and usable created instance.

2. The method of claim 1, wherein after receiving the non-idle state indication fed back by the scalable service cluster, the method further comprises:
   creating a new target application service corresponding to the application usage request by using a service expansion function corresponding to the scalable service cluster;
   deploying, in the target application service, at least one target application instance corresponding to a target application; and
   adding, into the scalable service cluster, the target application service having the successfully deployed target application instance, wherein the target application instance is used to respond to a new application usage request for the target application.

3. The method of claim 2, wherein deploying the at least one target application instance corresponding to the target application in the target application service comprises:
   obtaining application codes corresponding to the target application, and loading the application codes into a storage location corresponding to the target application service;

in response to the application code being successfully loaded, performing a port information obtaining operation on an application port corresponding to the application codes; and in response to the port information obtaining operation being completed, determining that the target application instance is deployed successfully; the application port being used for information transmission between the target application service and the target application instance.

4. The method of claim 1, wherein the method further comprises creating the reserved service cluster, including:

determining a first number of reserved instances to be deployed, based on a request reception peak value of a target application corresponding to the application usage request at each time period and a processing resource amount of the reserved instance corresponding to the target application;

determining a second number of reserved services to be created, based on a maximum number of deployed instances corresponding to the reserved service and the first number; and creating the second number of reserved services, and deploying a third number of reserved instances in each of the reserved services completely created, and treating the second number of reserved services having successfully deployed reserved instances, as the reserved service cluster, wherein a sum of the respective third numbers of reserved instances corresponding to the individual reserved services is equal to the first number.

5. The method of claim 4, wherein creating the second number of reserved services and deploying the third number of reserved instances in each of the reserved services completely created comprises:

selecting, from a plurality of service containers, a usable target service container for each of the reserved services in the second number of reserved services; and for each of the reserved services, creating the reserved service in a target service container corresponding to the reserved service, and deploying, in the target service container, the third number of reserved instances for the reserved service.

6. The method of claim 1, wherein after running, by the reserved service cluster, the reserved instance matching the application usage request, the method comprises:

obtaining the reserved instance matching the application usage request and a response result determined for the application usage request, and feeding the response result back to a user terminal sending the application usage request.

7. A computer device, comprises:
a processor and a memory,
the memory storing machine-readable instructions executable by the processor, the processor being configured to execute the machine-readable instructions stored in the memory, the machine-readable instructions, upon execution by the processor, causing the processor to perform acts comprising:
obtaining an application usage request;
determining, by using a traffic scheduler, identification information carried in the application usage request;
selecting, by using the identification information, from a plurality of different scalable service clusters, a scalable service cluster; the scalable service cluster to be used to run a created instance matching various application usage requests, and corresponding to a target application indicated by the identification information;

forwarding, by using the traffic scheduler, the application usage request to the scalable service cluster to be used; and in response to receiving a non-idle state indication fed back by the scalable service cluster, forwarding, by using the traffic scheduler, the application usage request to a reserved service cluster, to run, by the reserved service cluster, a reserved instance matching the application usage request;

wherein the non-idle state indication is used to indicate that the scalable service cluster currently has no idle and usable created instance.

8. The computer device of claim 7, wherein after receiving the non-idle state indication fed back by the scalable service cluster, the acts further comprise:

creating a new target application service corresponding to the application usage request by using a service expansion function corresponding to the scalable service cluster;

deploying, in the target application service, at least one target application instance corresponding to a target application; and adding, into the scalable service cluster, the target application service having the successfully deployed target application instance, wherein the target application instance is used to respond to a new application usage request for the target application.

9. The computer device of claim 8, wherein deploying the at least one target application instance corresponding to the target application in the target application service comprises:

obtaining application codes corresponding to the target application, and loading the application codes into a storage location corresponding to the target application service;

in response to the application code being successfully loaded, performing a port information obtaining operation on an application port corresponding to the application codes; and in response to the port information obtaining operation being completed, determining that the target application instance is deployed successfully; the application port being used for information transmission between the target application service and the target application instance.

10. The computer device of claim 7, wherein the acts further comprise creating the reserved service cluster, including:

determining a first number of reserved instances to be deployed, based on a request reception peak value of a target application corresponding to the application usage request at each time period and a processing resource amount of the reserved instance corresponding to the target application;

determining a second number of reserved services to be created, based on a maximum number of deployed instances corresponding to the reserved service and the first number; and creating the second number of reserved services, and deploying a third number of reserved instances in each of the reserved services completely created, and treating the second number of reserved services having successfully deployed reserved instances, as the reserved service cluster, wherein a sum of the respective third numbers of reserved instances corresponding to the individual reserved services is equal to the first number.

11. The computer device of claim 10, wherein creating the second number of reserved services and deploying the third number of reserved instances in each of the reserved services completely created comprises:
   selecting, from a plurality of service containers, a usable target service container for each of the reserved services in the second number of reserved services; and
   for each of the reserved services, creating the reserved service in a target service container corresponding to the reserved service, and deploying, in the target service container, the third number of reserved instances for the reserved service.

12. The computer device of claim 7, wherein after running, by the reserved service cluster, the reserved instance matching the application usage request, the acts comprise:
   obtaining the reserved instance matching the application usage request and a response result determined for the application usage request, and feeding the response result back to a user terminal sending the application usage request.

13. A non-transitory computer readable storage medium storing a computer program thereon, the computer program, upon running by a computer device, cause the computer device to perform acts comprising:
   obtaining an application usage request;
   determining, by using a traffic scheduler, identification information carried in the application usage request;
   selecting, by using the identification information, from a plurality of different scalable service clusters, a scalable service cluster; the scalable service cluster to be used to run a created instance matching various application usage requests, and corresponding to a target application indicated by the identification information;
   forwarding, by using the traffic scheduler, the application usage request to the scalable service cluster to be used; and
   in response to receiving a non-idle state indication fed back by the scalable service cluster, forwarding, by using the traffic scheduler, the application usage request to a reserved service cluster, to run, by the reserved service cluster, a reserved instance matching the application usage request;
   wherein the non-idle state indication is used to indicate that the scalable service cluster currently has no idle and usable created instance.

14. The non-transitory computer readable storage medium of claim 13, wherein after receiving the non-idle state indication fed back by the scalable service cluster, the acts further comprise:
   creating a new target application service corresponding to the application usage request by using a service expansion function corresponding to the scalable service cluster;
   deploying, in the target application service, at least one target application instance corresponding to a target application; and
   adding, into the scalable service cluster, the target application service having the successfully deployed target application instance, wherein the target application instance is used to respond to a new application usage request for the target application.

15. The non-transitory computer readable storage medium of claim 14, wherein deploying the at least one target application instance corresponding to the target application in the target application service comprises:
   obtaining application codes corresponding to the target application, and loading the application codes into a storage location corresponding to the target application service;
   in response to the application code being successfully loaded, performing a port information obtaining operation on an application port corresponding to the application codes; and
   in response to the port information obtaining operation being completed, determining that the target application instance is deployed successfully; the application port being used for information transmission between the target application service and the target application instance.

16. The non-transitory computer readable storage medium of claim 13, wherein the acts further comprise creating the reserved service cluster, including:
   determining a first number of reserved instances to be deployed, based on a request reception peak value of a target application corresponding to the application usage request at each time period and a processing resource amount of the reserved instance corresponding to the target application;
   determining a second number of reserved services to be created, based on a maximum number of deployed instances corresponding to the reserved service and the first number; and
   creating the second number of reserved services, and deploying a third number of reserved instances in each of the reserved services completely created, and treating the second number of reserved services having successfully deployed reserved instances, as the reserved service cluster, wherein a sum of the respective third numbers of reserved instances corresponding to the individual reserved services is equal to the first number.

17. The non-transitory computer readable storage medium of claim 16, wherein creating the second number of reserved services and deploying the third number of reserved instances in each of the reserved services completely created comprises:
   selecting, from a plurality of service containers, a usable target service container for each of the reserved services in the second number of reserved services; and
   for each of the reserved services, creating the reserved service in a target service container corresponding to the reserved service, and deploying, in the target service container, the third number of reserved instances for the reserved service.

* * * * *